United States Patent [19]
Harris et al.

[11] Patent Number: 4,897,854
[45] Date of Patent: Jan. 30, 1990

[54] ALTERNATE PULSE INVERSION ENCODING SCHEME FOR SERIAL DATA TRANSMISSION

[75] Inventors: John Harris; Nigel Bailey, both of El Paso, Tex.

[73] Assignee: General Instrument Corporation, New York, N.Y.

[21] Appl. No.: 315,557

[22] Filed: Feb. 24, 1989

[51] Int. Cl.⁴ .............................................. H04L 25/34
[52] U.S. Cl. ........................................ 375/17; 341/57; 375/22
[58] Field of Search ........................ 375/17, 22, 94, 37; 340/825.59, 825.63; 341/53, 68, 73, 70, 71, 57, 56; 370/50

[56] References Cited
U.S. PATENT DOCUMENTS
Re. 31,510  1/1984  Carbrey ................................ 370/50
3,434,059  3/1969  Kesolits .................................. 341/57
3,517,117  6/1970  Woodbury .............................. 341/57

Primary Examiner—Robert L. Griffin
Assistant Examiner—Marianne Huseman
Attorney, Agent, or Firm—Barry R. Lipsitz

[57] ABSTRACT

A method is provided for encoding and decoding data to be transmitted over a communication network via transformer coupling. The data is pulse width modulated, and split into separate first and second data streams containing alternate pulses. The first data stream is inverted, and recombined with the second data stream to produce a pulse width modulated bi-polar data signal having an alternating pulse sequence. The data is decoded at the receiver by inverting the pulses of one polarity, and combining them with the pulses of the other polarity to form a pulse width modulated data stream.

8 Claims, 3 Drawing Sheets

DATA ENCODE/DECODE WAVEFORMS

ALTERNATE PULSE INVERSION ENCODING SCHEME FOR SERIAL DATA TRANSMISSION

BACKGROUND OF THE INVENTION

This invention relates to the communication of data, and more particularly to a method of encoding and decoding data to be transmitted serially along a communication network in an environmentally hostile environment, such as in an automobile.

In order to transmit digital data over a communication network, the data is encoded at the transmitter and decoded at the receiver. Two known forms of encoding which are typically used with transformer coupled communication lines are Manchester Encoding and Alternate Mark Inversion. Both require a clock recovery circuit that uses a local oscillator or phased locked loop. These circuits can be complex and, accordingly, may be undesirable due to high cost and reliability problems stemming from their complexity.

Alternate Mark Inversion coding ("AMI") produces alternate positive and negative level pulses, symmetrical around zero volts, when successive high bits (ones) occur in sequence. As a result, AMI is a three-level or ternary signal, where a one is represented by either a positive-going or a negative-going pulse in a signal interval, while a zero is represented by the absence of a pulse in a signal interval. There is no DC component in the transmitted signal, the amount of energy in the signal at low frequencies is small, and compared with unipolar signalling such as standard serial non-return-to-zero (NRZ) data, AMI has a substantial advantage in that it has much more immunity to crosstalk. Crosstalk immunity with AMI is typically on the order of 23 dB.

Manchester coding uses only two levels for binary data, instead of a three-level signal as in AMI. Manchester coding uses the phase of a square wave signal to indicate a one or a zero. A zero has an opposite phase waveform from a one. Every signalling interval in Manchester coding contains a zero crossing to provide a good reference for timing recovery. Every interval contains an equal amount of positive and negative level so that the DC component of the composite signal is cancelled out.

Another encoding/decoding scheme used in digital data transmission is known as pulse width modulation (PWM). In this technique, a series of uniform amplitude pulses are transmitted. The duration of the pulses is modulated by the data, so that a binary one or zero is distinguished by the width of the pulse. PWM provides very simple clock recovery, and a minimal use of analog circuits. However, the varying DC component in a PWM signal makes it unsuitable for transformer coupled systems.

It has now been recognized that in certain applications, such as the high electromagnetic noise environment present in automotive systems, transformer coupling of data to a communication network is advantageous. If transformers are used to couple equipment to a twisted pair network cable, and the transformers are constructed to optimize balance, several benefits can be obtained. These include the reduction of line signal radiation by flux cancellation, a reduction in susceptibility to both magnetic and electric field interference by common mode rejection, and elimination of differential ground currents in the network cable. In an automobile environment, the voltage signals produced by currents flowing through the vehicle chassis ground are seen as common mode signals that would be completely cancelled if the transformers were perfectly balanced. An important result is that load switching transients cannot use the network data cable as an antenna to radiate RF interference.

Commonly-owned, copending U.S. patent application Ser. No. 07/315,471 filed concurrently herewith and entitled "Communication Network" describes a data transmission network that uses transformer coupling. The disclosure in that application is incorporated herein by reference.

It would advantageous to provide a digital data encoding and decoding scheme which enjoys the advantages of both AMI and pulse width modulation, and is suitable for use in transformer coupled systems. The present invention provides such a system.

SUMMARY OF THE INVENTION

In accordance with the present invention, a method is provided for encoding data for serial transmission along a data path. A stream of data bits, for example a serial NRZ data stream, is pulse width modulated. The pulse width modulated data is split into separate first and second data streams containing alternate pulses. The first data stream is inverted, and recombined with the second data stream to provide a pulse width modulated bi-phase data signal having an alternating pulse sequence.

The first data stream can contain every other pulse from the pulse width modulated data. The second data stream would then carry the remaining pulses from the pulse width modulated data.

The encoded data can be decoded by inverting the pulses of one polarity, and combining the inverted pulses with the pulses of the other polarity to form a standard pulse width modulated data stream.

DETAILED DESCRIPTION OF THE INVENTION

Figure 1:
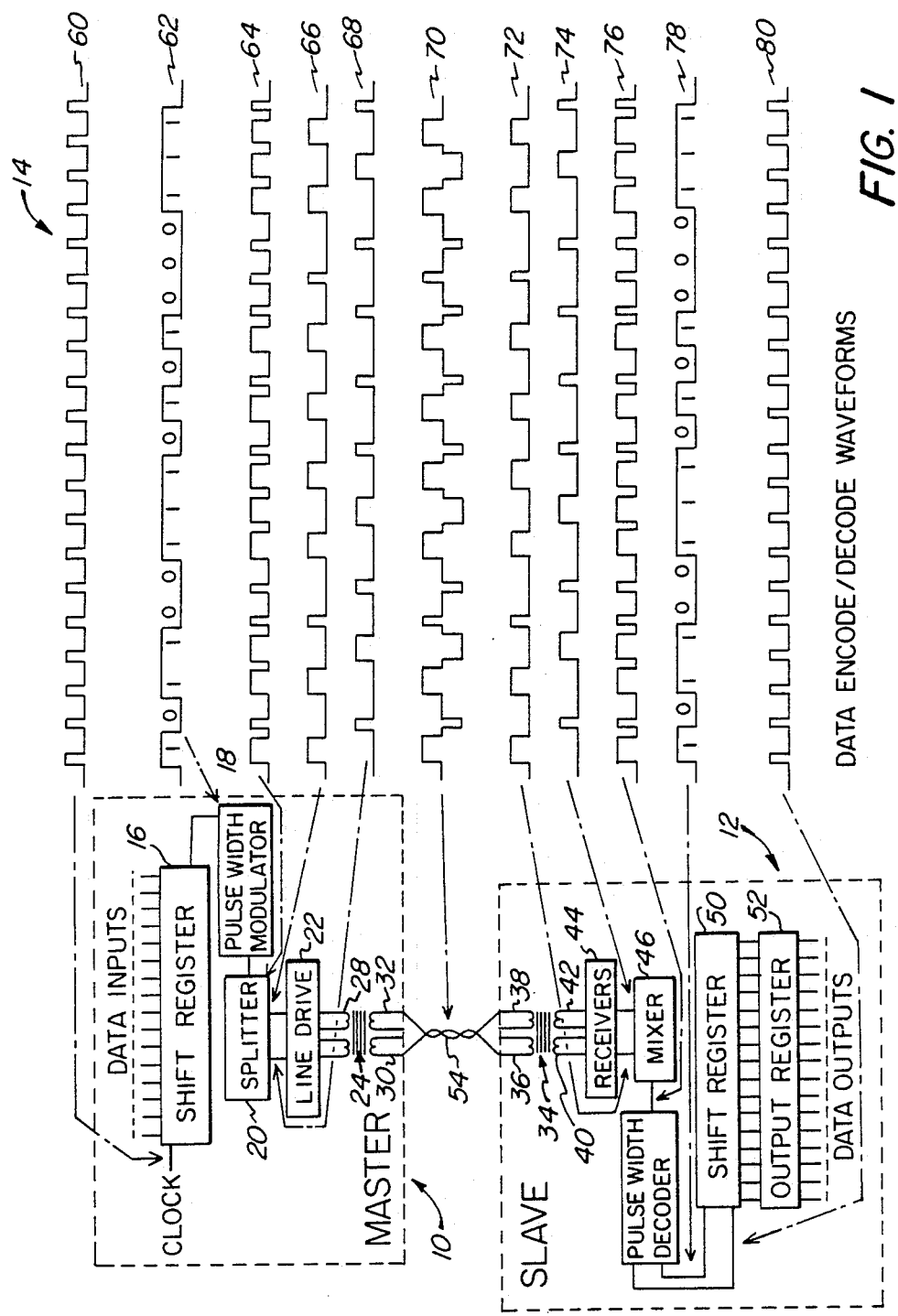
FIG. 1 is a schematic diagram of a communication network using a master/slave protocol, with appended waveforms which demonstrate the method of the present invention.

The novel encoding scheme of the present invention provides for serial data transmission and allows simple clock recovery and transformer coupling of the data signal to a communication network. Such a network is represented by twisted cable 54 shown in FIG. 1.

A master controller 10 communicates with a slave 12 over network 54. Data is input to a shift register in master controller 10 from a data source, such as a system microprocessor (not shown). Shift register 16 is driven by a clock waveform 60, and outputs the data in serial NRZ form as shown in waveform 62.

The serial NRZ data of waveform 62 is input to a pulse width modulator 18 to provide PWM encoded data as illustrated by waveform 64. As explained in more detail below in connection with the description of FIG. 2, pulse width modulator 18 modulates a square wave clock signal. The leading edge of the square wave signal occurs at a constant time interval corresponding to the data transmission bit rate. The trailing edge of the waveform is time modulated with respect to the leading edge to encode the data. Typically, the trailing edge of the pulse is at 25 percent of the period for a zero data bit and at 75 percent of the period for a one data bit. The resultant PWM encoded data is input to a splitter 20 where alternate pulses are split into separate data streams, represented by data stream A of waveform 66 and data stream B of waveform 68. As illustrated in FIG. 1, data stream A (waveform 66) is formed by splitting every other pulse from the pulse width modulated data (waveform 64), and data stream B (waveform 68) contains the remaining pulses from the pulse width modulated data.

Data stream A and data stream B are input to a conventional line drive circuit 22 which interfaces the data streams with transformer windings 28 and 26, respectively of transformer 24, converting the logic level data streams A and B to analog levels for transmission over the network. Secondary windings 30, 32 are provided on transformer 24 for outputting the data to communication network 54. Transformer 24 inverts data stream B, and recombines the inverted data stream with data stream A to form a pulse width modulated bi-polar signal with a fundamental frequency that is half the data bit rate. The resultant signal is depicted by waveform 70. By alternating the pulses in the negative and positive directions as shown in waveform 70, the DC component present in a normal pulse width modulated signal can be cancelled. Pairs of ones or zeros balance perfectly. One-zero and zero-one pairs have an equal but opposite DC component. Since the overall waveform will not comprise merely one-zero and zero-one pairs, perfect balance requires the use of equalizing pulses to make the number of positive and negative "one" pulses equal within a message.

This can be achieved by extending the length of a message to accommodate such equalizing pulses, determining the number of equalizing pulses required to balance the signal at the completion of a message, and inserting the equalizing pulses to provide such balance. As a practical matter, equalizing the number of ones in data streams A and B to provide DC balance is not essential for short message blocks.

The recombined data of waveform 70 can be filtered, or its slew rate can be controlled to remove undesirable harmonic components that are more than three times the data rate.

Each message is framed by a start and stop bit. A start bit, which is preceded by a minimum of three idle bits, may consist of an alternating pulse sequence violation with a data one. A stop bit may consist of a sequence violation with a data zero. The use of signal sequence violations to distinguish framing bits from data and idle bits is a known technique. The generation and the detection of a violation can be accomplished using an exclusive OR gate.

The data transmitted through the network is received by a slave control 12 through a transformer 34. The data from network 54 is input to windings 36, 38 of transformer 34. The received waveform 70 is coupled through the transformer to secondary windings 40, 42. Transformer 34 inverts the negative going pulses of waveform 70 and separates them from the combined input waveform to recreate data stream A (as shown in waveform 72) and data stream B (as shown in waveform 74). These waveforms are passed through conventional line receivers 44 to a mixer 46 where they are combined to recreate the PWM encoded data, as shown in waveform 76. Receivers 44 serve to convert the analog signal from transformer 34 to separate logic level data streams.

The PWM data of waveform 76 is then decoded by pulse width decoder 48 to recreate the serial NRZ data originally output from shift register 16. The decoded NRZ serial data is input to a shift register 50, together with the clock signal (waveform 80) recovered by pulse width decoder 48, and from shift register 50 to output register 52. From output register 52, the data is input to an application processor (not shown) for accomplishing an intended result.

Figure 2:
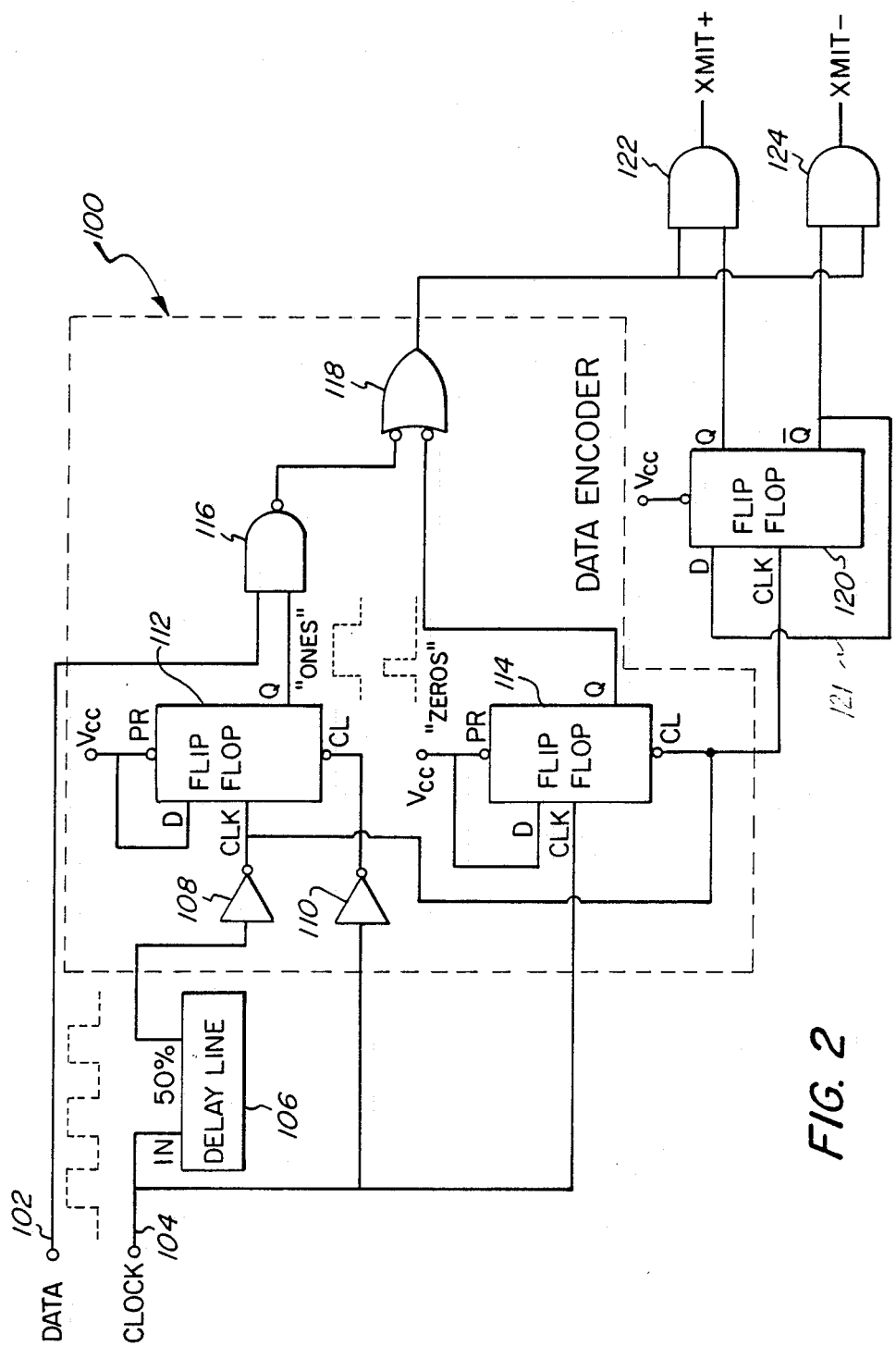
FIG. 2 is a schematic diagram of the data encoder portion of the master controller shown in FIG. 3 is a schematic diagram of the mixer and decoder portions of the slave depicted in FIG. 1.

FIG. 2 is an example of circuitry that can be used for pulse width modulator 18 and splitter 20. A square wave clock signal is input at terminal 104. The clock is input to a delay line 106 of one-half clock interval length. The delayed clock signal is output from a 50 percent tap to an inverter 108 which is input to the clock of a D-type flip-flop 112. The clock signal is also inverted by an inverter 110 and input, without any delay, to the clear terminal of flip-flop 112. The resultant signal on the output $\overline{Q}$ of flip-flop 112 is used to encode the binary ones in the data stream to be encoded. This is accomplished by NANDing the output of flip-flop 112 with the data to be encoded from terminal 102 in NAND gate 116.

The clock signal from terminal 104 is also coupled to the clock input of another D-type flip-flop 114. The clear input of flip-flop 114 is driven by the delayed clock signal from inverter 108. The $\overline{Q}$ output of flip-flop 114 forms the zeros in the encoded data. This signal is NORed with the output of NAND gate 116 in NOR gate 118 to provide the PWM encoded data as depicted by waveform 64 in FIG. 1.

The function of splitter 20 is provided by flip-flop 120 in conjunction with NAND gates 122, 124. The clock input of flip-flop 120 is driven by the inverted, delayed clock signal output from inverter 108. Outputs Q and $\overline{Q}$ alternately enable AND gates 122 and 124 to output the encoded data. Thus, AND gate 122 will output data stream A shown in FIG. 1 (waveform 66) and AND gate 124 will output data stream B (waveform 68).

It is noted that an exclusive OR gate (not shown) can be placed in series within line 121 between the D and $\overline{Q}$ terminals of flip-flop 120 to generate signal sequence violations to be used as start and stop bits for each message.

Figure 3:
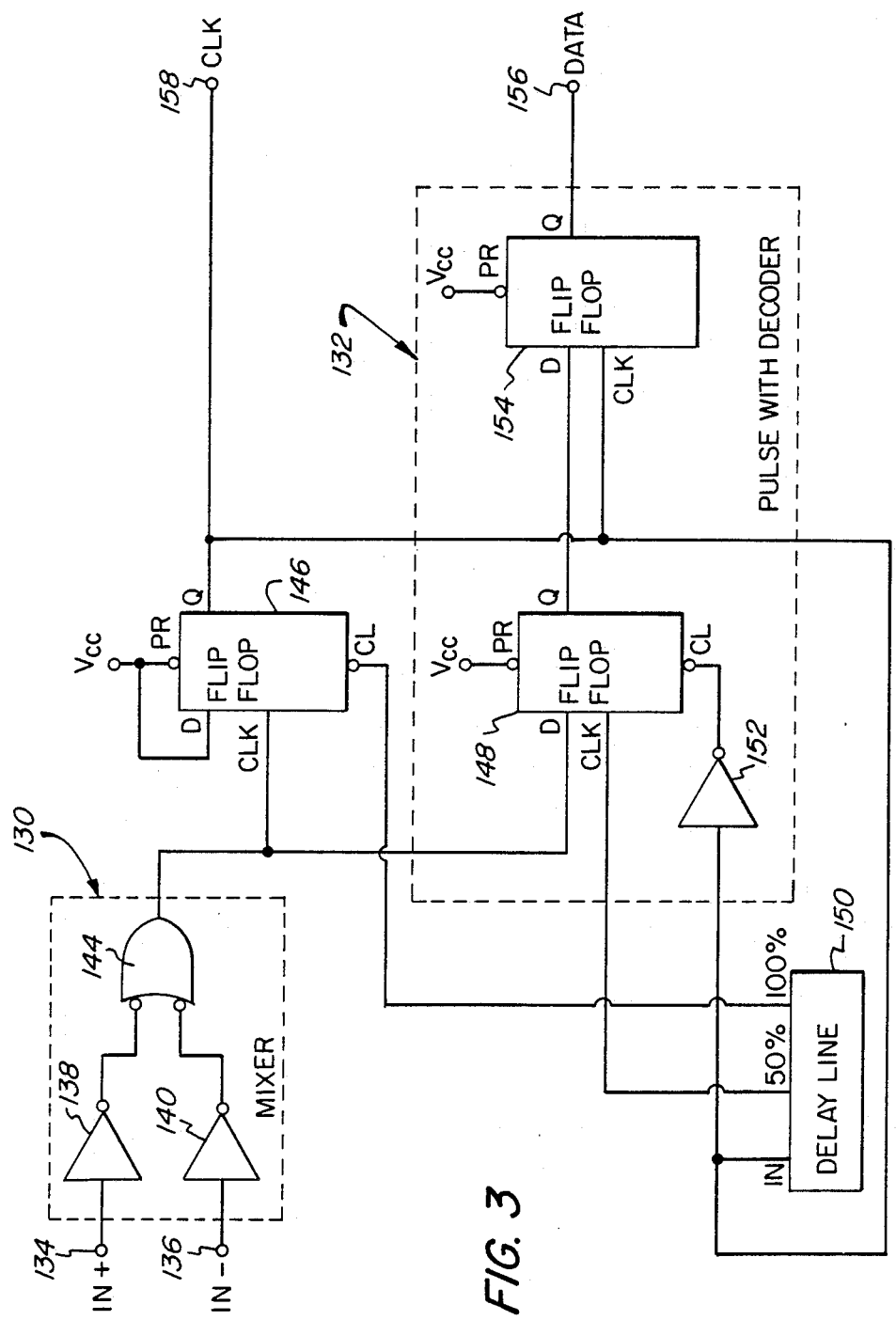

FIG. 3 is an example of circuitry that can be used for the mixer 46 and pulse width decoder 48 of slave 12. The recovered data stream A and data stream B are input to mixer circuit 130 at terminals 134 and 136. The input signals are inverted by inverters 138 and 140, and mixed by NOR gate 144 to provide the PWM encoded data signal depicted by waveform 76 in FIG. 1. This signal is applied to the clock input of flip-flop 146 to provide the recovered clock signal (waveform 80) at terminal 158.

The signal output from mixer 130 is also input to a pulse width decoder, generally designated 132, at the D input of flip-flop 148. The clock input of flip-flop 148 is coupled to the 50 percent tap of a one-half clock interval length delay line 150. The input of delay line 150 is driven by the recovered clock signal output by flip-flop 146. The 100 percent tap of delay line 150 is coupled to the clear input of flip-flop 146.

The recovered clock from the output of flip-flop 146 is also input to an inverter 152 which is coupled to the clear input of flip-flop 148. The Q output of flip-flop 148 is input to the D input of another D-type flip-flop 154. The clock input of flip-flop 154 is driven by the recovered clock signal. The decoded serial NRZ data, depicted in waveform 78 of FIG. 1, is output from the Q output of flip-flop 154 at terminal 156.

Start and stop bits which frame a message can be detected by a conventional violation detector (not shown) coupled to receive the data from mixer 130.

It will now be appreciated that the present invention provides a new and improved method for encoding data for serial transmission along a data path, combining the advantages of pulse width modulation with the transformer coupling capabilities of alternate mark inversion. By using pulse width modulation, ease of clock recovery is accommodated without the need for expensive and complex clock recovery circuitry. The problem of a significant DC component in conventional pulse width modulated transmission, which has heretofore precluded PWM from being used in transformer coupled networks, is overcome.

What is claimed is:

1. A method for encoding data for serial transmission along a data path comprising the steps of:
   pulse width modulating a stream of serial NRZ data bits;
   splitting the pulse width modulated data into separate first and second data streams containing alternate pulses;
   inverting said first data stream; and
   recombining the inverted first data stream with the second data stream to produce a pulse width modulated bi-polar data signal having an alternating pulse sequence.

2. The method of claim 1 wherein said first data stream is formed by splitting every other pulse from the pulse width modulated data, and the second data stream contains the remaining pulses from the pulse width modulated data.

3. A method for decoding pulse width modulated data serially transmitted along a data path in a format having unipolar pulses of alternating polarity, comprising the steps of:
   inverting the pulses of one polarity;
   combining the inverted pulses with the pulses of the other polarity to form a pulse width modulated data stream; and
   decoding said pulse width modulated data stream.

4. The method of claim 3 comprising the further step of:
   retrieving the pulses of said one polarity from the serially transmitted data as a separate data stream apart from the pulses of the other polarity prior to said combining step.

5. A method for serially transmitting and receiving data along a data path comprising the steps of:
   pulse width modulating a stream of Ser. NRZ data bits;
   splitting the pulse width modulated data into separate first and second data streams containing alternate pulses;
   inverting said first data stream;
   combining the inverted first data stream with the second data stream to produce a pulse width modulated data signal having alternating pulses of opposite polarity;
   transmitting said pulse width modulated data signal over a communications network to a data receiver;
   inverting the pulses of one polarity at said receiver; and
   combining the inverted pulses with the other pulses from said pulse width modulated data signal to reconstruct the pulse width modulated stream of data bits.

6. The method of claim 5 comprising the further step of:
   retrieving the pulses of said one polarity at said receiver as a separate data stream apart from said other pulses, prior to said combining step.

7. The method of claim 5 comprising the further step of:
   decoding the pulse width modulated stream of data bits at said receiver to reconstruct the serial NRZ data stream.

8. The method of claim 5 wherein said first data stream is formed by splitting every other pulse from the pulse width modulated data, and the second data stream contains the remaining pulses from the pulse width modulated data.

* * * * *

UNITED STATES PATENT AND TRADEMARK OFFICE
CERTIFICATE OF CORRECTION

PATENT NO. : 4,897,854

DATED : January 30, 1990

INVENTOR(S) : Harris, et al.

It is certified that error appears in the above-identified patent and that said Letters Patent is hereby corrected as shown below:

Claim 5, line 3, change "Ser." to -- serial -- .

Signed and Sealed this

Eighth Day of January, 1991

Attest:

HARRY F. MANBECK, JR.

*Attesting Officer*   *Commissioner of Patents and Trademarks*